United States Patent [19]

Ezaki et al.

[11] Patent Number: 5,072,320
[45] Date of Patent: Dec. 10, 1991

[54] MAGNETIC RECORDING AND REPRODUCING APPARATUS HAVING IMPROVED DURABILITY

[75] Inventors: Joichiro Ezaki, Saku; Kazumasa Fukuda, Komoro; Masanori Sakai, Miyota, all of Japan

[73] Assignee: TDK Corporation, Tokyo, Japan

[21] Appl. No.: 316,318

[22] Filed: Feb. 27, 1989

[51] Int. Cl.$^5$ .................... G11B 5/012; G11B 5/82
[52] U.S. Cl. .................... 360/97.01; 360/135
[58] Field of Search ............ 360/135, 133, 102, 103, 360/104, 97.1; 428/694, 695, 900

[56] References Cited

U.S. PATENT DOCUMENTS

| | | | |
|---|---|---|---|
| 4,029,541 | 6/1977 | Barlow et al. | 360/135 X |
| 4,175,275 | 11/1979 | Schaefer | 360/104 |
| 4,189,759 | 2/1980 | Bauck et al. | 360/104 |
| 4,547,822 | 10/1985 | Brown | 360/78.07 X |
| 4,803,577 | 2/1988 | Ezaki et al. | 360/102 |

FOREIGN PATENT DOCUMENTS

| | | | |
|---|---|---|---|
| 0055603 | 7/1977 | Japan | 360/135 |
| 0287028 | 12/1986 | Japan | 360/135 |
| 0103847 | 5/1987 | Japan | 360/135 |
| 3117317 | 5/1988 | Japan | 360/135 |

*Primary Examiner*—David J. Severin
*Attorney, Agent, or Firm*—Oblon, Spivak, McClelland, Maier & Neustadt

[57] ABSTRACT

In a magnetic recording and reproducing apparatus of a type wherein a magnetic disk having a magnetic recording layer formed on a rigid substrate is rotated at a high speed and magnetic recording and reproduction are conducted by the magnetic head disposed on the surface of the disk, the magnetic recording and reproducing apparatus being characterized in that the magnetic recording layer constitutes an oxide layer, a nitride layer or an oxidized coating film at at least its surface layer, and the magnetic recording and reproducing are conducted by the magnetic head which is caused to be substantially in contact with the surface of magnetic disk at at least the innermost cylinder of the magnetic disk.

9 Claims, 3 Drawing Sheets

MAGNETIC RECORDING AND REPRODUCING APPARATUS HAVING IMPROVED DURABILITY

BACKGROUND OF THE INVENTION

Field of the Invention

The present invention relates to a magnetic recording and reproducing apparatus of a type wherein magnetic recording and reproducing are conducted by a magnetic head disposed on the surface of a magnetic disk of a rigid substrate while the disk is rotated at a high speed. Particularly, it relates to such apparatus wherein a magnetic recording layer on the magnetic disk constitutes an oxide layer, a nitride layer or an oxidized coating film at at least its surface layer, and recording and reproducing are conducted by a magnetic head which is caused to substantially contact with the surface of the magnetic disk at at least the innermost cylinder, whereby the durability of the magnetic disk and the magnetic head can be improved, the spacing loss can be reduced, and high density recording is made possible.

As is well known, in a magnetic recording and reproducing apparatus of this type, a hard magnetic disk comprising a rigid substrate made of aluminum and a thin magnetic layer formed thereon by a method such as a fine magnetic powder coating method, a plating method or a sputtering method, is rotated at a high speed so as to produce a dynamic pressure between the magnetic disk and a flying magnetic head so that the magnetic head is lifted and floats with a certain flying height by a fine air bearing, while the magnetic recording and reading are conducted.

In order to accomplish high density magnetic recording with a magnetic recording and reproducing apparatus of this type, it is necessary to minimize the flying height of the magnetic head and to reduce the spacing loss. However, when the flying height is reduced to thereby reduce the spacing loss, there is the risk of collision between the magnetic head and the surface of the magnetic disk by the influence of the surface properties of the disk, vibrations at the high speed operations and so on, whereby a damage of the magnetic disk or a head crash may occur. This causes reduction in the durability. In order to eliminate this disadvantage, the flying height q for the magnetic head 2 has been determined to be in a range of 0.1 μm–0.3 μm so as to obtain the durability. Therefore, there has been limit in reducing the spacing loss and high density magnetic recording.

A conventional technique to obtain high density magnetic recording by reducing a flying height of the magnetic head is disclosed in, for instance, Japanese Unexamined Patent Publication No. 287002/1986. In the known technique, recording and reproducing are conducted by bringing the magnetic head into substantial contact with a magnetic disk with a vertical magnetic recording layer comprising a cobalt serise alloy film formed on a rigid substrate while the head and the disk are relatively moved at a high speed.

However, since the conventional technique adapted to perform recording and reproducing by bringing the magnetic head substantially into contact with the surface of the vertical magnetic recording layer constituted by a metallic film or an alloy film having a low hardness, a problem such as a damage to the magnetic disk or a head crash may easily occur and the durability tends to be low.

The present invention is to eliminate the above-mentioned problem and is to provide a magnetic recording and reproducing apparatus of a type wherein a magnetic disk having a magnetic recording layer formed on a rigid substrate is rotated at a high speed, and magnetic recording and reproduction are conducted by a magnetic head disposed on a surface of the disk, the magnetic recording and reproducing apparatus being characterized in that the magnetic recording layer constitutes an oxide layer, a nitride layer or an oxidized coating film at at least its surface layer, the magnetic recording and reproducing are conducted by the magnetic head which is caused to be substantially in contact with the surface of magnetic disk at at least an innermost cylinder of the magnetic disk.

EMBODIMENTS

Figure 1:
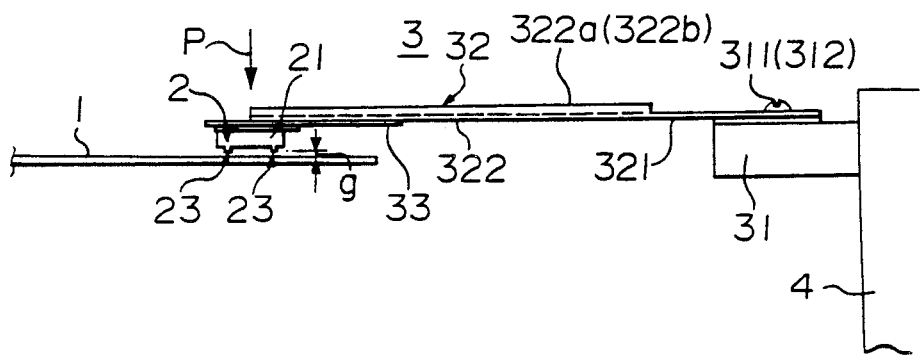
FIG. 1 is a front view of a magnetic recording and reproducing apparatus of the present invention.
Figure 2:
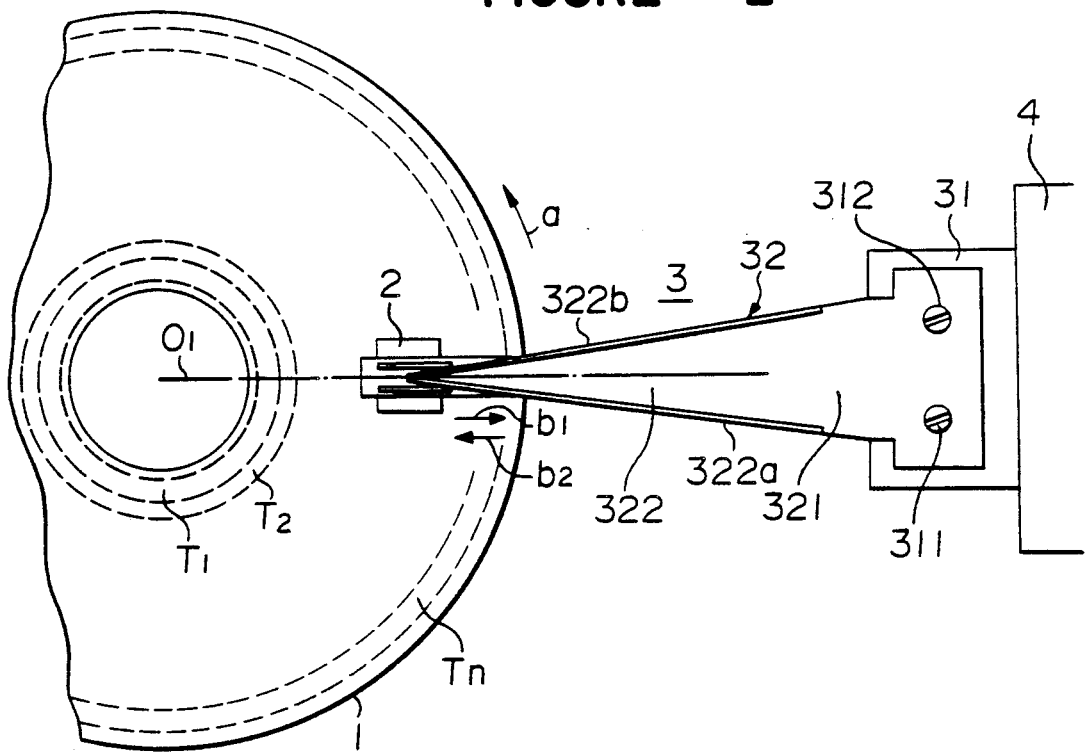
FIG. 2 is a plan view thereof.

FIG. 1 is a front view of a magnetic recording and reproducing apparatus of the present invention, and FIG. 2 is a plan view thereof. In the drawings, reference numeral 1 indicates a magnetic disk, numeral 2 indicates a magnetic head, numeral 3 indicates a gimbal supporting device, and numeral 4 indicates a positioning device for the head. The magnetic disk 1 is rotationally driven in the direction of an arrow a by a rotational drive mechanism (not shown). The magnetic head 2 is supported by the gimbal supporting device 3 and driven by the positioning apparatus 4 in the direction of an arrow $b_1$ and $b_2$ along the rotational diameter $O_1$ for positioning, as seen in FIG. 2, whereby the magnetic recording or reproduction is conducted at a predetermined cylinder among $T_1$ to $T_n$.

In this case, the recording and reproducing are conducted in such a manner that the magnetic disk 2 is brought substantially in contact with the surface of the magnetic disk 1 at at least are area of the innermost cylinder $T_1$. With such construction, the spacing loss can be reduced and excellent recording characteristics and recording density characteristics can be obtained.

In the magnetic disk 1, a magnetic recording layer is constituted by an oxide layer, a nitride layer or an oxidized coating film having a high hardness at at least its surface layer as described detailedly later. With such structure, a damage caused by a collision of the magnetic head 2 with the disk 1 can be minimized and the durability is improved. The magnetic head 2 may be lifted from the surface of the magnetic disk 1 at a cylinder at the outer side of the magnetic disk 1.

Figure 3:
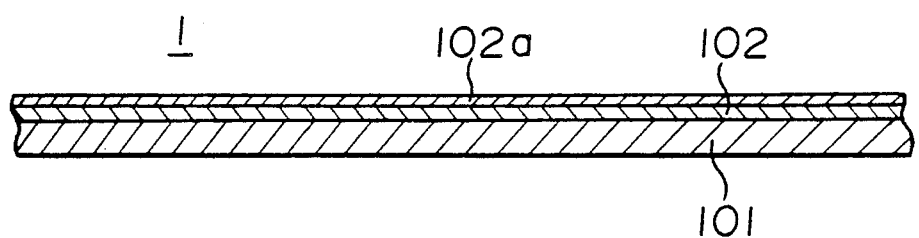
FIG. 3 is an enlarged cross sectional view of a part of a magnetic disk constituting a magnetic recording and reproducing apparatus of the present invention.
Figure 4:
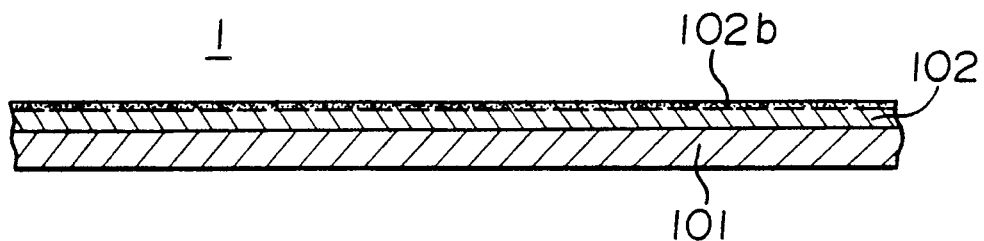
FIG. 4 is also an enlarged cross-sectional view of a part of magnetic disk according to another example.

The magnetic disk 1 is a medium having good surface properties with a surface roughness $R_{max}$ of at most 100 Å, preferably at most 50 Å. As shown in FIG. 3, the magnetic disk 1 comprises a rigid substrate 101 and a magnetic recording layer 102 formed on the surface of the substrate by a vacuum depositing method. The thickness of the magnetic recording layer 102 formed by the vacuum depositing method is at most 0.5 μm, and therefore the surface properties of the rigid substrate 101 is reflected as the surface properties in the recording layer 102. Accordingly, as the rigid substrate 101, the one having a surface roughness $R_{max}$ of at most 100 Å is employed. As specific examples of such a rigid substrate, rigid substrates composed essentially of glass, chemically reinforced soda alumino silicate glass or ceramics are suitable.

When the surface roughness $R_{max}$ is at most 100 Å, especially at most 50 Å, a trouble of head crush and so on can be avoided even when recording and reproducing are conducted under the condition that the magnetic head is substantially in contact with the magnetic disk. Therefore, the durability can be improved, the spacing loss can be reduced, and high density recording can be accomplished.

The magnetic recording layer 102 may be constituted by a magnetic iron oxide such as $\gamma$-$Fe_2O_3$ or a magnetic nitride. Further, when the magnetic layer is made of a metal or alloy, it is advisable to form an oxide layer or a nitride layer 102a on its surface as shown in FIG. 3, or it is advisable to convert the surface into an oxidized coating film 102b. Thus, the durability of the magnetic recording layer 102 can be improved, and it is possible to prevent a damage to the magnetic disk 1 even when the recording or reproduction is conducted by the magnetic head which is substantially brought into contact with the magnetic disk. The oxide layer or the nitride layer 102a can be formed by reactive sputtering or by reactive vapor deposition. The oxidized coating film 102b may be formed by intentionally oxidizing the surface of the magnetic recording layer 102 made of a metal or alloy containing at least one member of iron, cobalt and nickel, such as Co-Ni or Co-Cr, by e.g. reactive plasma treatment. The magnetic disk 1 may be of a vertical recording type wherein the recording residual magnetization is composed essentially of a component perpendicular to the recording layer or of an in-plane recording type wherein the recording residual magnetization is composed essentially of a component in the same plane as the recording layer. A lubricant may be coated on the surface of the magnetic recording layer 102 although such a embodiment is not shown in the drawings.

Figure 5:
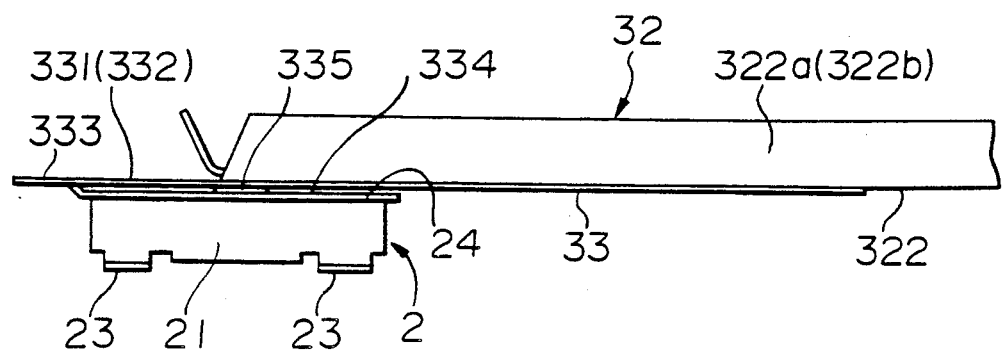
FIGS. 5 and 6 are views illustrating the assembly structure between a magnetic head and a supporting device.
Figure 6:
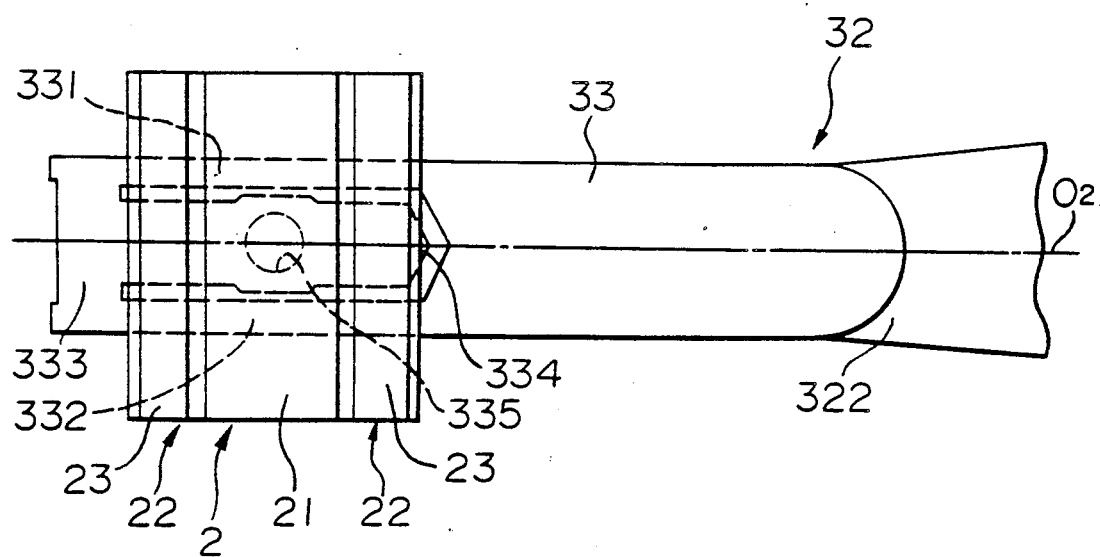

FIGS. 5 and 6 illustrate the assembly structure of the magnetic head 2 and the gimbal supporting device 3. The magnetic head 2 is provided with reading and writing elements 22 at the air discharge end of the slider 21 which is a ceramic structure and is supported for a pitching motion and a rolling motion by exerting a load to the surface 24 opposite to the flying surface 23 by the gimbal supporting device 3 driven by the positioning device 4. The reading and writing elements 22 are thin layer elements formed by a process similar to the technology for the production of an integrated circuit.

The supporting device 3 comprises a supporter 32 made of a resilient thin metal plate, one end of which is secured by fastening means 311 and 312 to a rigid arm 31, which is attached to the positioning apparatus 4. At the free end in the longitudinal direction of the supporter 32, a flexible member 33 made of the same thin metal plate is attached. On the lower surface of this flexible member 33, a magnetic head 2 is attached (FIGS. 1 and 2). The supporter 32 has a resilient spring portion 321 which is attached to the rigid arm 31. A rigid beam portion 322 is formed continuously from this resilient spring portion 321. The rigid beam portion 322 has flanges 322a and 322b formed by bending the beam portion along both sides. The flexible member 33 comprises two flexible outer frame portions 331 and 332 extending substantially in parallel with the axial line in the longitudinal direction of the supporter 32, a lateral frame 333 connecting the flexible outer frame portions 331 and 332 at the end far from the supporter 32 and a central tongue portion 334 extending substantially in parallel with the flexible outer frame portions 331 and 332 from about the center of the lateral frame 333 and having its forward end as a free end. One end opposite to the end having the lateral frame 333 is connected to near the free end of the supporter 32 by means of e.g. welding.

A loading projection 335 in a semi-spherical form is provided on the upper surface of the central tongue portion 334 of the flexible member 33 so that a loading force is transmitted from the free end of the supporter 32 to the central tongue portion 334. The surface 24 of the magnetic head 2 is bonded to the lower surface of the central tongue portion 334 by means of, for instance, an adhesive.

The shape of the magnetic head, and the rigidity and the spring pressure of the supporting device 3 are so determined taking account of the revolution member of the magnetic disk 1 that the magnetic head 2 is substantially brought into contact with the surface of the magnetic disk 1 at least the innermost cylinder $T_1$ of the disk 1.

As described above, in accordance with the present invention, recording and reproducing are conducted by bringing the head into contact with the surface of the magnetic disk at at least the innermost cylinder wherein a magnetic recording layer on the magnetic disk constitutes an oxide layer, an nitride layer or an oxidized coating film at at least its surface layer. Accordingly, a magnetic recording and reproducing apparatus capable of improving the durability of the disk and the head, reducing the spacing loss and accomplishing high density recording can be provided.

What is claimed is:

1. A magnetic recording and reproducing apparatus comprising:
   a magnetic disk having a rigid substrate for rotation at a high speed, a magnetic recording layer, formed on the rigid substrate, and a surface; and
   a magnetic head for contacting the surface of the magnetic disk and for conducting magnetic recording and reproduction;
   wherein at least the surface of the magnetic disk is made of one of a single oxide layer, a nitride layer and an oxidated coating film;
   wherein the rigid substrate is one of a chemically reinforced soda alumino silicate glass, a ceramic material and essentially a glass material; and
   wherein the magnetic head is in substantial contact with the surface of the magnetic disk at at least an innermost cylinder thereof.

2. The magnetic recording and reproducing apparatus according to claim 1, wherein the surface roughness $R_{max}$ of the magnetic disk is adjusted at a level of at most 100 Å.

3. The magnetic recording and reproducing apparatus according to claim 1, wherein said substrate has a surface roughness $R_{max}$ of at most 100 Å.

4. The magnetic recording and reproducing apparatus according to claim 1, wherein the magnetic recording layer is formed by vacuum depositing.

5. The magnetic recording and reproducing apparatus according to claim 1, wherein one of the oxide layer and the nitride layer is formed by reactive sputtering or reactive vapor deposition.

6. The magnetic recording and reproducing apparatus according to claim 1, wherein the surface of the magnetic disk is the oxidized coating film which is formed by oxidizing a surface of the magnetic recording layer composed of a metal or alloy comprising at least one member selected from the group consisting of iron, cobalt and nickel.

7. The magnetic recording and reproducing apparatus according to claim 1, wherein a recording residual magnetization of the magnetic disk is composed essentially of a component perpendicular to the magnetic recording layer.

8. The magnetic recording and reproducing apparatus according to claim 1, wherein the recording residual magnetization of the magnetic disk is composed essentially of a component in the same plane as the magnetic recording layer.

9. A magnetic disk for use with a magnetic recording and reproducing apparatus wherein the magnetic disk is rotated and magnetic recording and reproduction are conducted by a magnetic head disposed in substantial contact on a surface of the disk, the magnetic disk comprising:
   a rigid substrate of a chemically reinforced soda alumino silicate glass; and
   a magnetic recording layer formed on the rigid substrate and having one of an oxide layer, a nitride layer and an oxidized coating film which forms the surface of the disk on which the magnetic head is disposed in substantial contact for magnetic recording and reproduction.

* * * * *